US00RE38124E

(19) United States
(12) Reissued Patent
Mallette et al.

(10) Patent Number: US RE38,124 E
(45) Date of Reissued Patent: May 27, 2003

(54) SNOWMOBILE SUSPENSION

(75) Inventors: Bertrand Mallette, Rock-Forest (CA); Gerard J. Karpik, Eveleth, MN (US)

(73) Assignees: Bombardier Inc. (CA); Polaris Industries Partners L.P., Minneapolis, MN (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/567,344

(22) Filed: Nov. 30, 1995

Related U.S. Patent Documents

Reissue of:
(64) Patent No.: 5,265,692
Issued: Nov. 30, 1993
Appl. No.: 07/804,385
Filed: Dec. 10, 1991

(51) Int. Cl.[7] ..... B62D 55/116
(52) U.S. Cl. ..... 180/193; 180/9.25; 180/9.56
(58) Field of Search ..... 180/190, 193, 180/184, 9.25, 9.5, 9.54, 9.56, 9.52

(56) References Cited

U.S. PATENT DOCUMENTS

| | | | | | |
|---|---|---|---|---|---|
| 3,658,392 | A | * | 4/1972 | Perreault et al. | 180/193 |
| 3,727,709 | A | * | 4/1973 | Newman | 180/193 |
| 3,788,412 | A | * | 1/1974 | Vincent | 180/193 |
| 3,879,092 | A | * | 4/1975 | Rose | 180/193 |
| 3,933,213 | A | | 1/1976 | Trowbridge | 180/193 |
| 3,944,005 | A | * | 3/1976 | Tomita | 180/193 |
| 3,945,663 | A | | 3/1976 | Duckett | 280/708 |
| 3,966,181 | A | * | 6/1976 | Lessard | 180/193 |
| 4,057,916 | A | | 11/1977 | Rosemer | 37/223 |
| 4,131,266 | A | | 12/1978 | Carter | 267/34 |
| 4,222,453 | A | * | 9/1980 | Fixsen et al. | 180/193 |
| 4,226,408 | A | | 10/1980 | Tomita et al. | 267/64.22 |
| 4,311,302 | A | | 1/1982 | Heyer et al. | 267/64.23 |
| 4,407,386 | A | | 10/1983 | Yasui et al. | 180/193 |
| 4,411,342 | A | | 10/1983 | Katsumori et al. | 188/315 |
| 4,442,926 | A | | 4/1984 | Muto | 188/317 |
| 4,518,056 | A | | 5/1985 | Kobayashi | 180/190 |
| 4,700,815 | A | | 10/1987 | Persicke et al. | 188/286 |
| 4,987,965 | A | | 1/1991 | Bourret | 180/193 |
| 5,370,198 | A | | 12/1994 | Karpik | 180/193 |

FOREIGN PATENT DOCUMENTS

| | | | |
|---|---|---|---|
| CA | 895747 | * | 3/1972 |
| CA | 942802 | * | 2/1974 |
| CA | 944001 | * | 3/1974 |
| CA | 956674 | * | 10/1974 |
| CA | 994395 | * | 8/1976 |
| CA | 1026807 | * | 2/1978 |
| CA | 1029425 | * | 4/1978 |

* cited by examiner

*Primary Examiner*—Kevin Hurley
(74) *Attorney, Agent, or Firm*—Larson & Taylor PLC

(57) ABSTRACT

In a snowmobile track suspension, the slide frame is supported upon downwardly and rearwardly angled front and rear suspension arm assemblies. The suspension arm assemblies are of similar construction, length, and orientation, having upper ends connected to fixed pivots in the snowmobile chassis and lower ends pivoted to the slide frame. The lower end of the rear suspension arm assembly has a pivot mount that is movable longitudinally of the slide frame. Movement in the forwards direction being blocked by an abutment which ensures that during suspension travel the front end of the slide frame cannot move higher than the rear end thereof.

5 Claims, 4 Drawing Sheets

SNOWMOBILE SUSPENSION

Matter enclosed in heavy brackets [ ] appears in the original patent but forms no part of this reissue specification; matter printed in italics indicates the additions made by reissue.

BACKGROUND OF THE INVENTION a) Field of the Invention

This invention relates to a new or improved snowmobile track belt suspension.

b) Description of the Prior Art

Snowmobile track belt suspensions often employ a slide frame pressed into contact with the upper side of the ground engaging run of the track belt loop by spring arrangements associated with suspension arm assemblies by which the slide frame is connected to the snowmobile chassis. Typically, two angulated arm assemblies are employed to connect the slide frame to the snowmobile chassis, and these arm assemblies are movable independently of one another to permit the slide frame to accommodate itself to static and dynamic forces arising in operation.

Irregularities in the terrain travelled by the snowmobile produce displacements and deflections of the snowmobile front suspension that supports the vehicle on the skis, and of the rear suspension. Depending upon their magnitude, frequency, and strength, these deflections cause more or less discomfort to the operator of the snowmobile. The present inventor theorizes that suspension displacements that produce angular acceleration of the snowmobile and its operator about a transverse horizontal axis produce more discomfort than displacements that merely produce vertical acceleration of the vehicle and its operator.

Accordingly it is an object of the invention to provide a snowmobile track belt suspension that will provide a reduced angular acceleration as compared to prior art snowmobile track suspensions.

SUMMARY OF THE INVENTION

The invention provides a snowmobile suspension comprising: a slide frame carried on downwardly and rearwardly angled front and rear suspension arm assemblies that are supported in the snowmobile chassis, said suspension incorporating spring means acting on said arm assemblies to urge said slide frame downwardly into contact with the ground-engaging run of the snowmobile track belt; said front and rear arm assemblies being substantially equal in length and generally parallelly arranged to position said slide frame substantially horizontally with respect to the snowmobile chassis; said frame arm assembly having upper and lower ends connected to fixed first and second pivots on the snowmobile chassis and on the slide frame respectively; said rear arm assembly having an upper end connected to a third fixed pivot on said snowmobile chassis, and having a lower end connected to a displaceable pivot that is movable longitudinally of said slide frame; movement of said displaceable pivot forwardly of said slide frame being limited by an abutment that is positioned so that the suspension arms form a parallelogram linkage, and which thus prevents the front end of the slide frame from moving to a higher position than the rear end thereof relative to said chassis; guide means on said slide frame adapted to accommodate movement of said displaceable pivot rearwardly away from said abutment to permit movement of the rear end of said slide frame to a higher position than the front end thereof relative to said snowmobile chassis.

With such an arrangement it is ensured that the loading imposed upon the track suspension by undulations in the terrain over which the snowmobile travels acts more on the front part of the track suspension than on its rear part, and thus effectively moves the average point of application of the vertical forces forwardly closer to the center of gravity of the vehicle, and accordingly reduces the resulted couple that produces the undesired angular acceleration.

BRIEF DESCRIPTION OF THE DRAWINGS

The invention will further be described, by way of example only, with reference to the accompanying drawings wherein.

DESCRIPTION OF THE PREFERRED EMBODIMENT

Figure 1A:
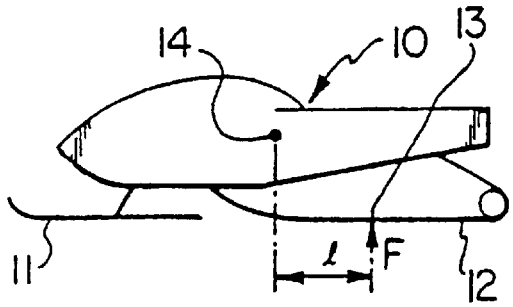
FIG. 1A (PRIOR ART)
FIGS. 1A and 1B are generally schematic side elevations of a snowmobile.
Figure 1B:
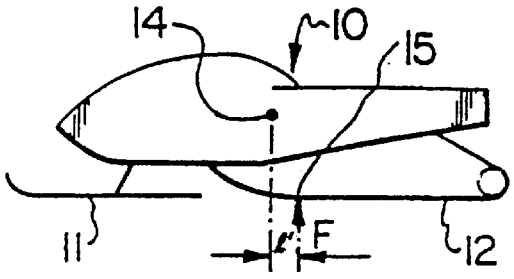

Referring to FIGS. 1A and 1B, a snowmobile chassis 10 is schematically illustrated as being supported in the usual manner upon a pair of steerable skis 11 at its forward end and upon the ground engaging run of a driven track belt 12 at its rearward end. FIG. 1A represents the situation that exists with a track suspension of prior art construction wherein the loading point 13 where ground induced forces absorbed by the track suspension are applied to the snowmobile chassis is positioned rearwardly of the snowmobiles center of gravity 14 by a distance l.

It will be understood that the angular acceleration $\alpha$ applied to the snowmobile when the track encounters an undulation that generates a force F at the loading point 13 will be directly proportional to the couple T and inversely proportional to the moment of inertia I of the snowmobile about its center of gravity.

In other words $$\alpha = T/I$$

The couple T is the product of the force F and the distance l, so that accordingly the angular acceleration for a given force F is directly proportional to the distance l.

Figure 2:
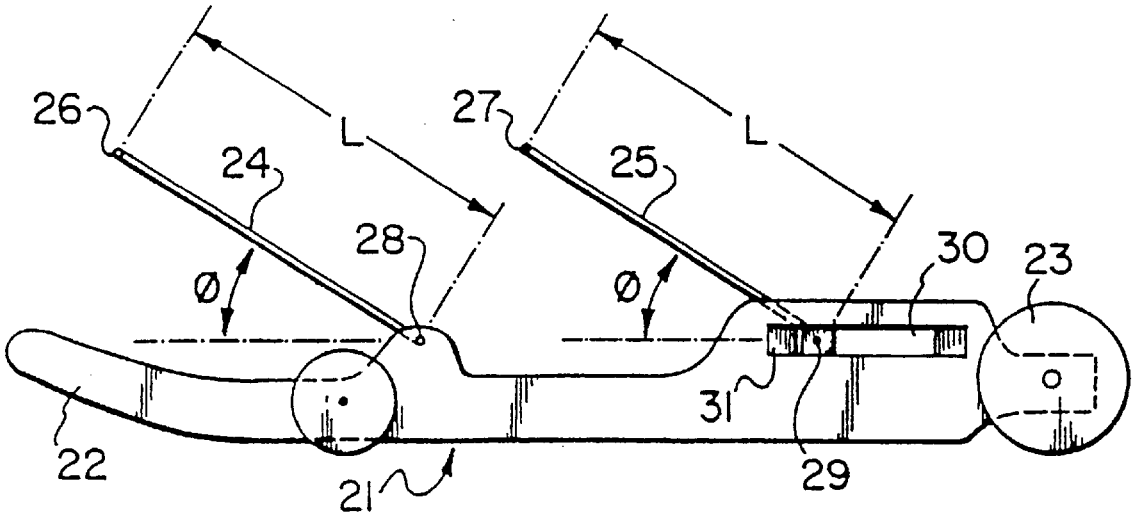
FIG. 2 is a somewhat schematic side elevation of a slide frame and the suspension arm assemblies of a snowmobile track suspension.

FIG. 1B represents the dynamic condition in which the snowmobile track suspension is re-configured so that under the same operating conditions the force F is applied at a loading point 15 that is spaced further forwardly than in FIG. 1A at a distance l' from the center of gravity 14. It will be appreciated that with this configuration the angular acceleration applied to the snowmobile is greatly reduced. The snowmobile track suspension now to be described in relation to FIGS. 2 through 6 has been designed to achieve a reduction in this angular acceleration Referring to FIG. 2, the track suspension includes an elongate slide frame 21 with an upwardly curved forward end 22, and carrying at its rear end in known manner, adjustable idler wheels 23 over which the track belt is constrained to pass. The slide frame 21 contacts the upper side of the ground engaging run of the track belt 12 and is in turn connected to the snowmobile chassis 10 by front and rear suspension arm assemblies 24, 25. The suspension arm assemblies 24, 25 are of substantially the same length, and are arranged at a similar orientation, i.e. inclined downwardly from front to rear, being connected at their upper ends to fixed pivots 26, 27 respectively on the snowmobile chassis 10. The suspension arm assemblies 24, 25 extend at substantially the same angle θ to the horizontal as indicated in FIG. 2, the front arm assembly having its lower end attached to a fixed pivot 28 and the rear arm assembly having its lower end attached to a movable pivot 29. The movable pivot 29 is received in a guide means 30, being movable longitudinally thereof, and the guide means defining an abutment 31 at its forward end positioned as shown in FIG. 2.

FIG. 2 shows the static position of the track suspension. The front and rear arm assemblies 24, 25 are of the same length L and are arranged at the same angle θ with respect to the horizontal, the movable pivot 29 being in this condition at the forward end of its range of movement and adjacent the abutment 31. In this condition it will be seen that when the front suspension arm 24 is pivoted upwardly about pivot 26, the rear suspension arm 25 is constrained to follow the same movement since the arms are forced to act as a parallelogram linkage. Accordingly the slide frame 21 will remain horizontal as it deflects upwardly. Specifically the front end of the slide frame cannot move to a higher location than the rear end during this displacement since the movable pivot 29 is blocked by the abutment 31.

Figure 3A:
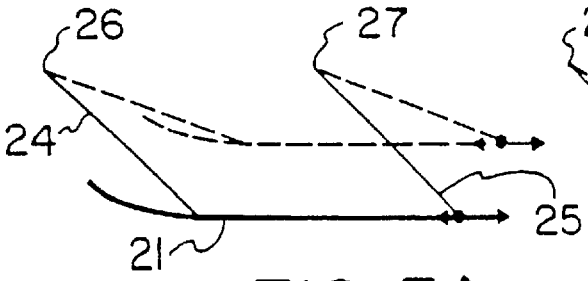
FIGS. 3A and 3B are schematic views illustrating the action of the components of FIG. 2.
Figure 3B:
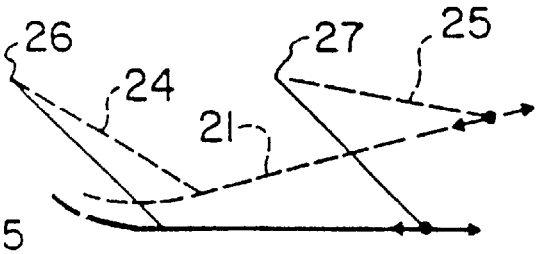

However the slide frame will be free to assume a position as shown in broken lines in FIG. 3B as might occur as a result of tension in the track 12 or otherwise. This movement is accommodated by rearward displacement of the movable pivot 29 in the guide 30.

Figure 4:
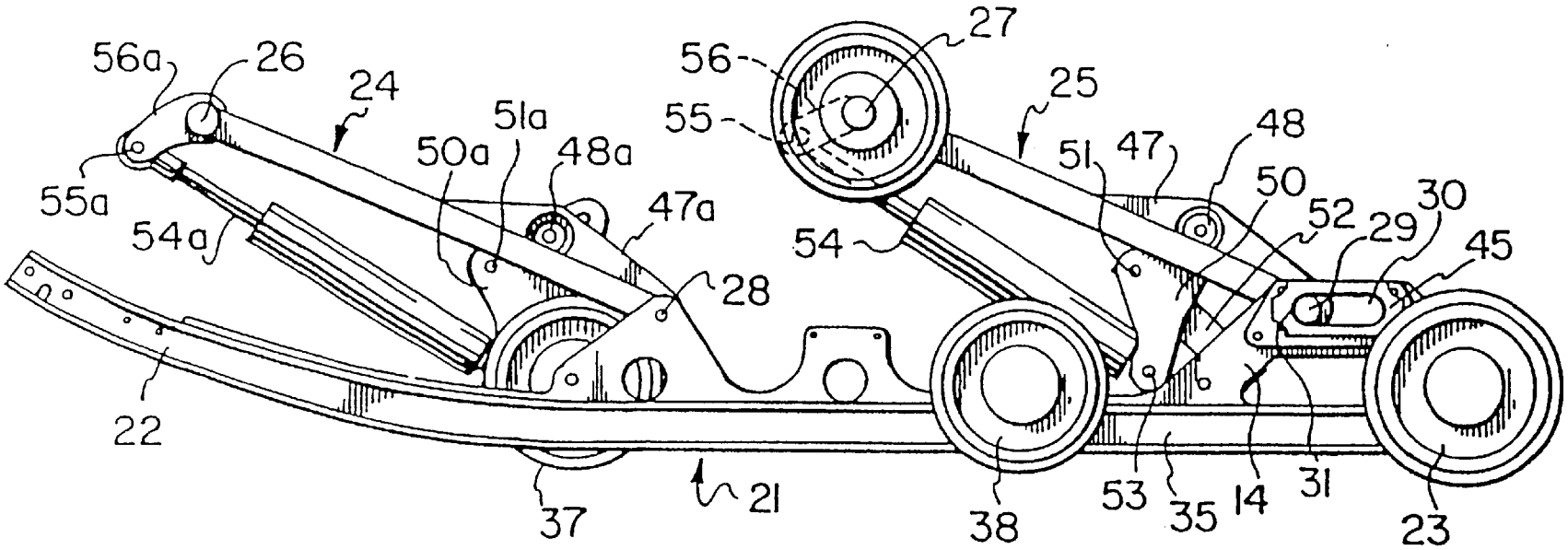
FIG. 4 is a somewhat more detailed side elevational view of a snowmobile slide frame and suspension arm assemblies.
Figure 5:
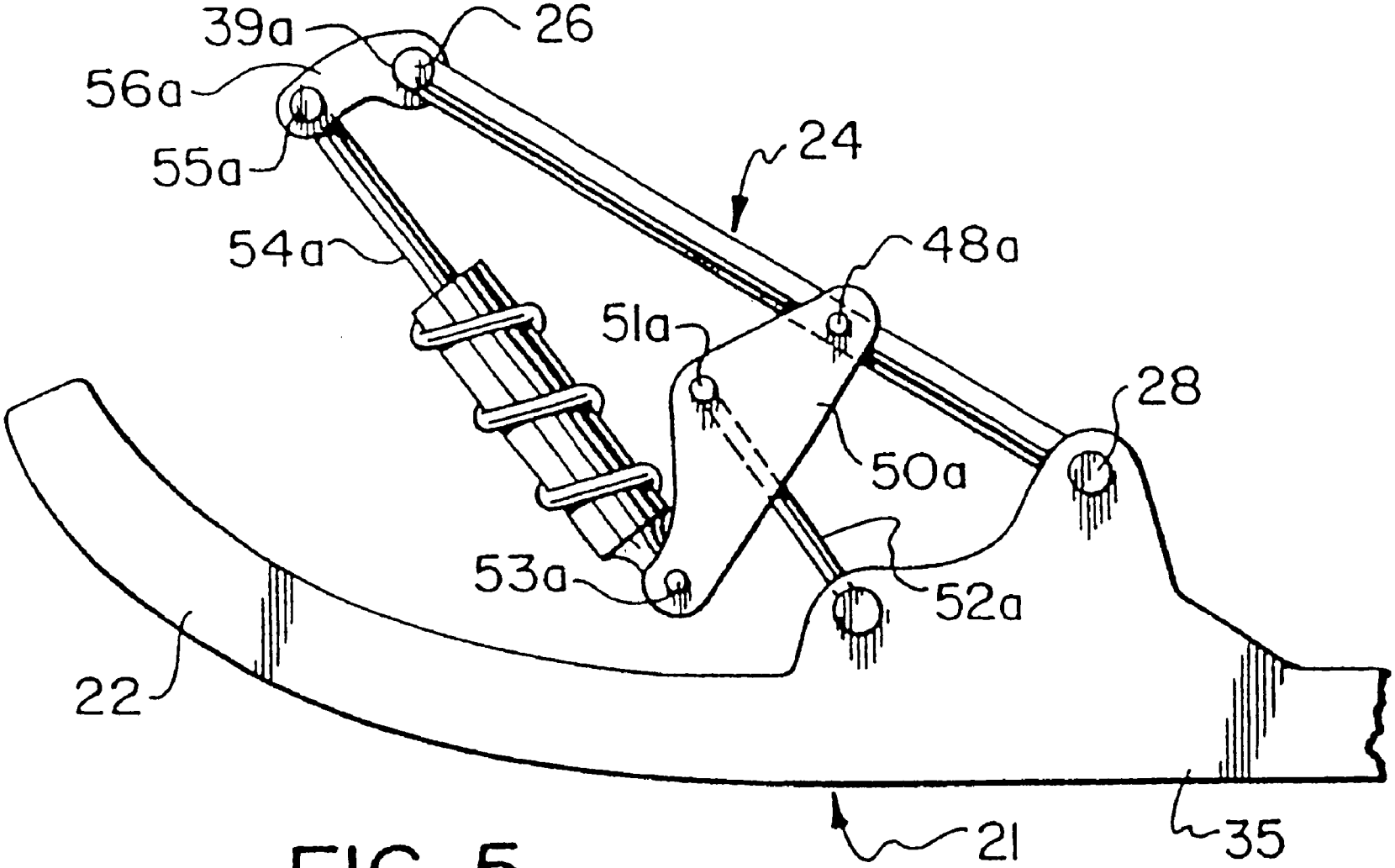
FIG. 5 is a somewhat schematic view of the front portion of the suspension of FIG. 4.
Figure 6:
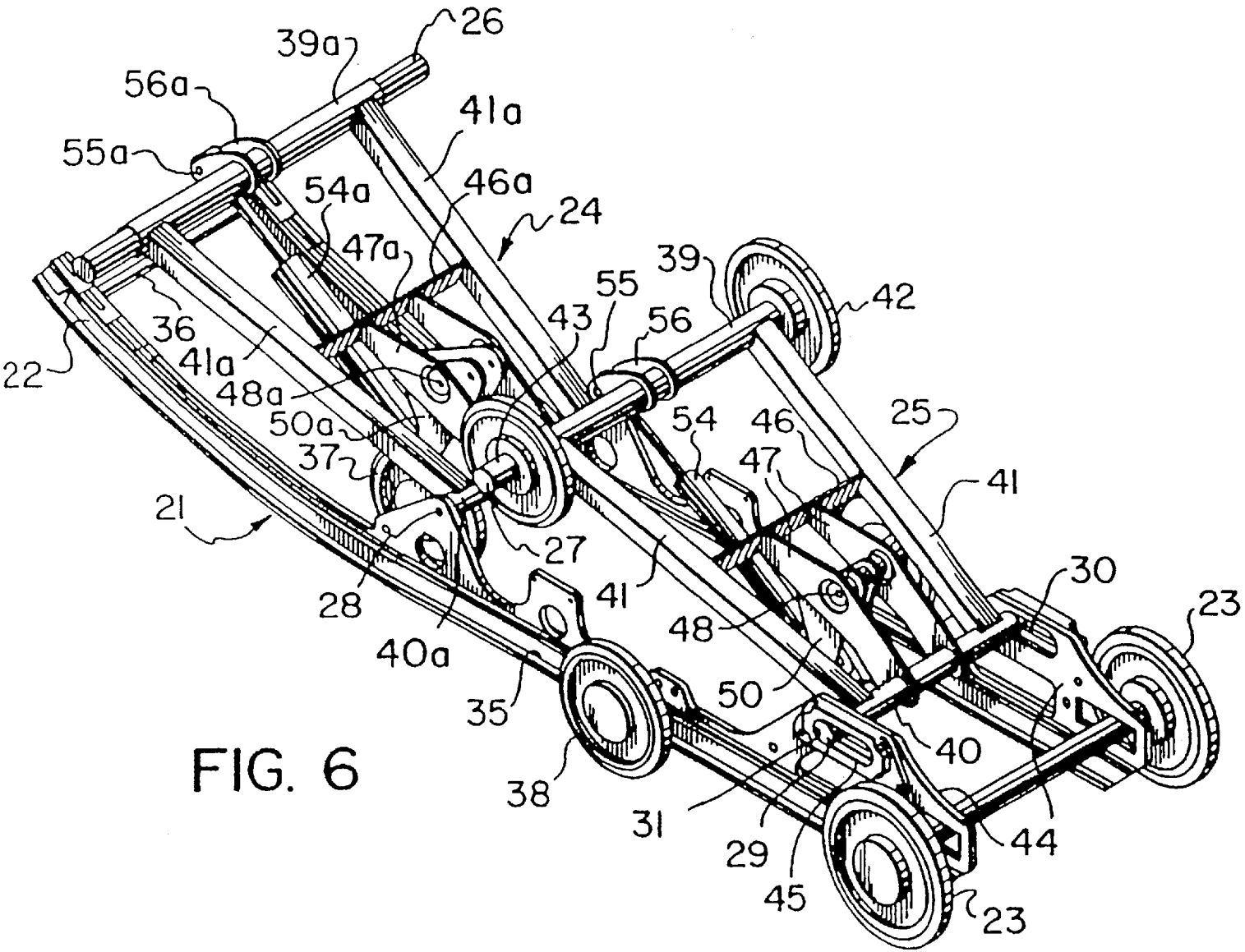
FIG. 6 is a top rear and side perspective view of the snowmobile slide suspension of FIG. 4.

The structure of the slide frame 21 and the suspension arm assemblies 24, 25 and their associated components is more clearly illustrated in relation to FIGS. 4, 5 and 6. Referring to FIG. 6 it will be seen that the slide frame 21 comprises two transversely spaced elongate runners 35 interconnected by suitable transverse struts 36. In conventional manner, the runners 35 are upwardly curved towards their forward ends and also include on their undersides friction reducing coatings or the like (not shown) for engagement with the snowmobile track belt 12. The friction generated in this engagement can be further reduced by idler wheels 37, 38 arranged in pairs at intermediate locations on the slide frame and having lower peripheries projecting slightly below the underside of the slide frame runners 35.

The rear suspension arm assembly 25 as best seen in FIG. 6 comprises a horizontal upper tube 39 interconnected to a horizontal lower tube 40 by laterally spaced upwardly divergent longitudinal members 41. The outboard ends of the upper tube 39 carry idler wheels 42 to support the return run (not shown) of the track belt 12, and also support stub shafts 43 which provide the pivot attachment 27 to the snowmobile chassis.

The lower tube 40 carries on its outboard ends the movable pivots 29 in the form of slide blocks 29a of suitable lower friction material, which are longitudinally movable in the guide means 30. As shown, each runner 35 has an upwardly extending lug plate 44 having an elongate slot through which the associated end of the lower tube 40 passes. The guide means 30 is defined by a cover plate 45 that is releasably secured to the lug plate 44 by suitable fastener means.

An intermediate cross piece 46 is mounted on the longitudinal members 41 and supports the forward ends of a pair of spaced parallel gusset plates 47 the rear ends of which are supported on the lower tube 40. Intermediate their ends the gusset plates 47 provide a pivotal mounting 48 for a bell crank plate 50 which has an intermediate pivotal connection 51 to a diagonally arranged strut 52 that is pivotally supported on the slide frame, and a further pivotal connection 53 to the lower end of a combined coiled spring/hydraulic damper unit 54. The upper end of the damper unit forms a pivotal connection 55 to a radially projecting lug arm 56 that is rigidly attached to the upper tube 39.

From this it will be seen that the damper unit 54 extends below and generally longitudinally of the rear suspension arm assembly 25. The configuration of the linkage provided by the bell crank 50, the strut 52 and the lug arm 56 is such that the resistance of the damper unit to upwards deflection of the rear suspension arm assembly 25 is applied at a desired rate.

The front suspension arm assembly 24 is similarly configured to the rear suspension arm assembly including upper and lower tubes 39a and 40a interconnected by longitudinal members 41a, the upper tube having stub shafts 43a at its ends, but not supporting any idler wheels. The lower tube 41 is connected to the pivot axis 28 provided in upwardly projecting lug plates 44a on the runners 35. Gusset plates 47a are supported between a cross piece 46a and the lower tube 40a and provide a pivot 48a for a bell crank plate 50a which is likewise pivoted at 51a to a strut 52a and at 53a to the lower end of a damper unit 54a. The upper end of the damper unit has a pivotal connection 55a to a lug arm 56a on the upper tube 39a.

For convenience in illustration, the elements are shown in somewhat simplified form in FIGS. 4 and 6, and in particular the damper units 54, 54a are shown without their coil springs. These components are of well known design and need not be illustrated in detail.

From the foregoing description and a consideration of the drawings, and in particular FIGS. 2, 3a and 3b, it will be evident that under uniform loading applied to the suspension from the slide frame 21, the arm assemblies 24 and 25 will occupy the relative positions shown in FIG. 2, i.e. will be parallel, so that the slide frame 21 will lie essentially parallel to the line between the upper pivots 26 and 27, and, as shown in broken lines in FIG. 3a, will maintain this parallel relationship during variations in the magnitude of the uniform loading. As will be apparent, this parallelogram linkage will be maintained even in the event that the slide frame 22 is subjected to non-uniform loading where the load point is offset towards the front end. This is because, by virtue of the parallelogram arrangement of the suspension and the fact that the movable pivot 29 at the lower end of the rear suspension arm assembly 25 is in engagement with the abutment 31, the forward lower pivot 28 is prevented from moving to a higher level relative to the chassis than the level of the movable pivot 29. However in the event that a non-uniform loading is applied to the chassis 21 offset towards the rear end thereof, it will be evident that the rear suspension arm assembly 25 can deflect upwardly to a greater extent than the front suspension arm assembly 24, as illustrated schematically in FIG. 3b, this increased deflection being accommodated by the fact that the movable pivot 29 can in this made move rearwardly in the guide 30.

What I claim as my invention is:

1. A snowmobile suspension comprising: a slide frame carried on downwardly and rearwardly angled front and rear suspension arm assemblies that are supported in the snowmobile chassis, said suspension incorporating spring means acting on said arm assemblies to urge said slide frame downwardly into contact with the ground-engaging run of the snowmobile track belt;

said front and rear arm assemblies being substantially equal in length and generally parallelly arranged to position said slide frame substantially horizontally with respect to the snowmobile chassis;

said front arm assembly having upper and lower ends connected to fixed first and second pivots on the snowmobile chassis and on the slide frame respectively;

said rear arm assembly having an upper end connected to a third fixed pivot on said snowmobile chassis, and having a lower end connected to a displaceable pivot that is movable longitudinally of said slide frame;

said slide frame defining an abutment that establishes a forwardmost position of said displaceable pivot relative to said slide frame, said abutment being located such that in said forwardmost position of the displaceable pivot, the front and rear arm assemblies define with said slide frame and said chassis a parallelogram linkage which prevents said second pivot from moving to a higher position [that] *than* said displaceable pivot relative to said chassis;

guide means on said slide frame adapted to accommodate movement of said displaceable pivot rearwardly away from said abutment to permit movement of said displaceable pivot to a higher position than said second fixed pivot relative to said snowmobile chassis.

2. A snowmobile suspension as claimed in claim 1 wherein said slide frame comprises two laterally spaced longitudinally extending rails with upwardly curved front ends, each rail having an upwardly projecting lug forward of the mid point in its length, said lugs being horizontally aligned;

said front arm assembly comprising horizontal upper and lower tubes spaced apart and interconnected by transversely spaced longitudinal members to form a rigid structure, said upper tube forming said first fixed pivot with said chassis and said lower tube forming said second fixed pivot with said lugs of said slide frame;

said spring means comprising a combined coil spring and hydraulic damper unit centrally arranged longitudinally of said front arm assembly, said upper tube rigidly supporting a radially extending short lug arm that forms a pivotal connection with the upper end of said damper unit, the lower end of said damper unit being connected to a linkage system that is coupled to said slide frame and to said front arm assembly, said linkage being so configured as to apply to said damping unit a compressive displacement as upwards displacement of the slide frame increases.

3. A snowmobile suspension as claimed in claim 2 wherein the rear suspension arm assembly likewise comprises horizontal upper and lower tubes spaced apart and interconnected by transversely spaced longitudinal members to form a rigid structure in which said upper tube forms said third fixed pivot with said chassis and said lower tube forms said displaceable pivot, each end of the rear suspension arm assembly lower tube carrying a slide block, each slide block being received in a respective longitudinally extending guideway carried on an upwardly projecting lug plate on the respective slide rail.

4. A snowmobile suspension as claimed in claim 3 wherein each end of the lower tube of the rear suspension arm assembly defines a cylindrical stub shaft that is pivotally received in a low-friction slide block, said stub shaft projecting through an elongate slot in said lug plate, and said guideway being defined between said lug plate and a cover plate that is detachably secured thereto.

*5. A snowmobile suspension comprising: a slide frame carried on downwardly and rearwardly angled front and rear suspension arm assemblies that are supported in the snowmobile chassis, said suspension incorporating spring means acting to urge said slide frame downwardly into contact with the ground-engaging run of the snowmobile track belt;*

*said front and rear arm assemblies being substantially equal in length and generally parallelly arranged to position said slide frame substantially horizontally with respect to the snowmobile chassis;*

*said front arm assembly having upper and lower ends connected to fixed first and second pivots on the snowmobile chassis and on the slide frame respectively;*

*said rear arm assembly having an upper end connected to a third fixed pivot on said snowmobile chassis, and having a lower end connected by a connection to a displaceable pivot that is connected to said slide frame in such a manner as to be movable longitudinally of said slide frame;*

*said slide frame defining an abutment that establishes a forwardmost position of said displaceable pivot relative to said slide frame, said abutment being located such that in said forwardmost position of the displaceable pivot, the front and rear arm assemblies define with said slide frame and said chassis a parallelogram linkage which limits the height to which the front end of the slide frame can be moved relative to the height of the rear end thereof during upward displacement of said slide frame relative to said chassis;*

*the connection between said displaceable pivot and said slide frame being adapted to accommodate movement of said displaceable pivot rearwardly away from said abutment to permit movement of said displaceable pivot to a higher relative position than said second fixed pivot during upwards displacement of said slide frame relative to said snowmobile chassis.*

* * * * *